United States Patent [19]

Yamaoka et al.

[11] Patent Number: 4,811,891
[45] Date of Patent: Mar. 14, 1989

[54] METHOD OF ASSEMBLING VEHICLE BODY OF TWO-WHEELED VEHICLE AND ASSEMBLING APPARATUS THEREFOR

[75] Inventors: Naoji Yamaoka; Shogo Ozawa; Naoki Fukai; Masayuki Yuzawa; Takeshi Nakamura; Yutaka Asano, all of Sayama, Japan

[73] Assignee: Honda Giken Kogyo Kabushiki Kaisha, Tokyo, Japan

[21] Appl. No.: 181,947

[22] Filed: Apr. 15, 1988

[30] Foreign Application Priority Data

Apr. 17, 1987 [JP] Japan .................................. 62-93265
Jul. 17, 1987 [JP] Japan ................................ 62-177170

[51] Int. Cl.$^4$ .......................................... B23K 9/225
[52] U.S. Cl. ..................................... 228/182; 228/186; 228/6.1; 228/49.1; 228/49.2; 29/466; 29/469; 901/42
[58] Field of Search ............... 228/182, 186, 212, 213, 228/6.1, 49.1, 49.2; 29/466, 469; 901/42

[56] References Cited

U.S. PATENT DOCUMENTS 3,968,558  7/1976  Sekine et al. .
4,493,450  1/1985  Yuzui ................................. 228/49.1

FOREIGN PATENT DOCUMENTS 561182  12/1976  Japan .
132396   8/1983  Japan .................................. 228/49.2
132397   8/1983  Japan .................................. 228/49.2
141398   8/1984  Japan .................................. 228/49.2
147994   7/1986  Japan .................................. 228/49.1
147995   7/1986  Japan .................................. 228/49.1

*Primary Examiner*—Fred Silverberg
*Assistant Examiner*—Samuel M. Heinrich
*Attorney, Agent, or Firm*—Armstrong, Nikaido, Marmelstein & Kubovcik

[57] ABSTRACT

Vehicle body of a two-wheeled vehicle assembled by holding a plurality of center members on a center jig which may be movable between a setting station and a coupling station, setting side frame members on a pair of side frame jigs in a prostrate posture at a position laterally adjacent the coupling station with the side frame jigs being a jig frame formed of frame materials with spaces therebetween, welding the side frame members together by welding robots adjacent the coupling station, erecting the side jigs to position the welded side frames in position with respect to the center members on the center jig, and welding the side frames to the center members using the same welding robots extending through the spaces in the jig frame of the side frame jigs.

7 Claims, 15 Drawing Sheets

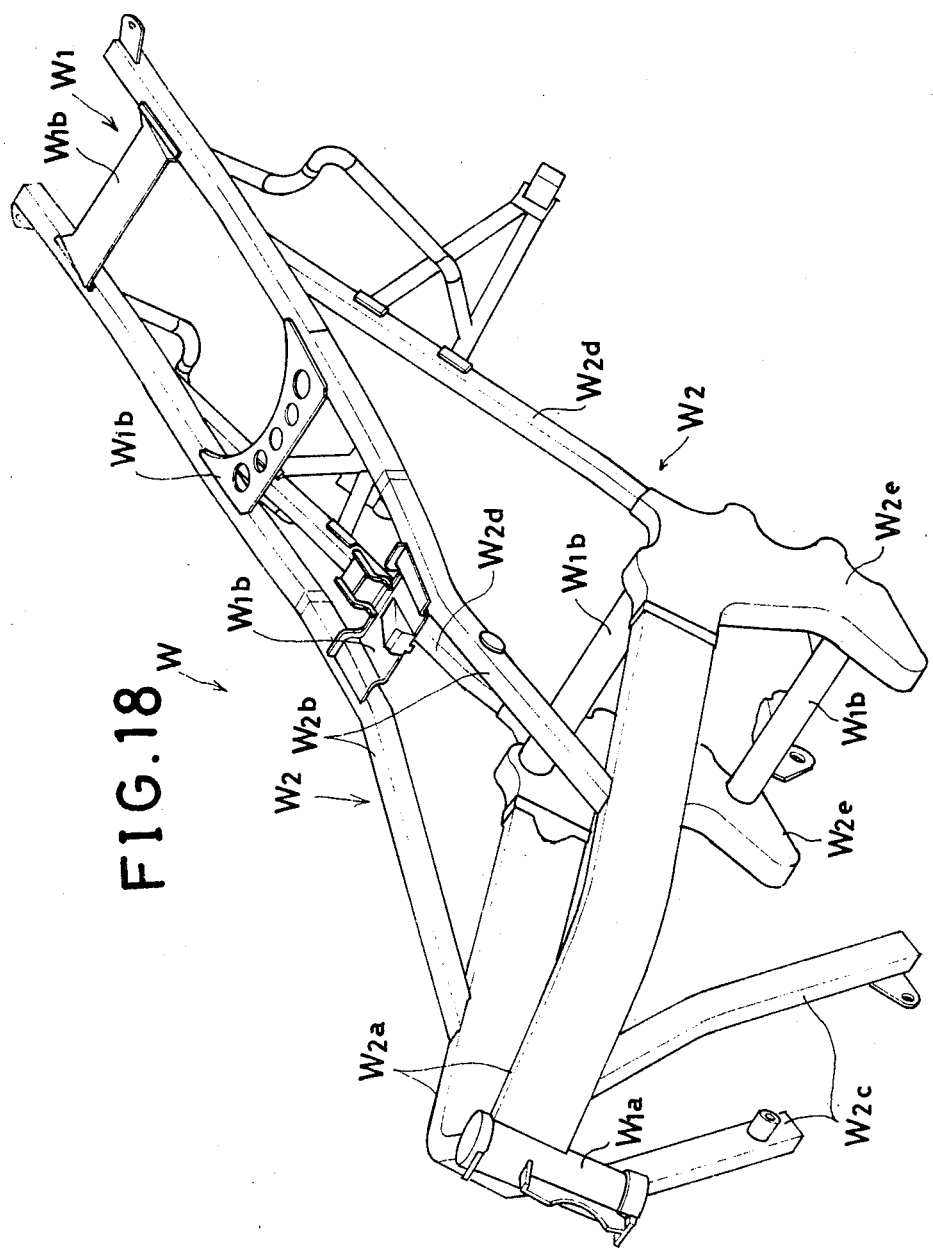

METHOD OF ASSEMBLING VEHICLE BODY OF TWO-WHEELED VEHICLE AND ASSEMBLING APPARATUS THEREFOR

BACKGROUND OF THE INVENTION

The present invention relates to a method of assembling a vehicle body of a two-wheeled vehicle by welding a plurality of center members, including a head pipe and cross members of the vehicle body, together with side frames on left and right-hand sides of the vehicle body, and to an assembling apparatus therefor.

There has been known, as disclosed in the Japanese Pat. Publication No. 1182/1981, a method of assembling a two-wheeled vehicle body that uses a center jig for holding center members and a pair of side jigs arranged on the left and right-hand sides for holding the side frames on the left and right-hand sides. The side frames are set on the side jigs in their prostrate positions. The side jigs are then erected on both sides of the center jig, and the center members and the side frames are welded to each other by a plurality of welding torches mounted on the side jigs.

In the above-described prior art method since the side frames assembled after welding a plurality of side frame members together are set on side jigs, a device for assembling the side frames is separately needed. It is also necessary to prepare for each model of machine a plurality of side jigs with welding torches mounted thereon. Such side jigs are complex and expensive. Consequently, the equipment costs are greater as a whole. Furthermore, since the side frames are removed from welding jigs of the side frame assembly device after having been assembled and are then set on the side jigs, there are cases where the side frames become deformed due to welding strains. In addition, since the welding torches are fixed on the side jigs, welding between the side frames and the center members can be effected only by spot welding. This creates a problem that when the vehicle body is transferred onto another jig and final welding is applied, deformation of the body due to welding strains is liable to occur owing to the insufficient weld strength of the spot welds.

OBJECT AND SUMMARY OF THE INVENTION

The present invention has for its object to provide a method of assembling a vehicle body of a two-wheeled vehicle wherein the welding to assemble the side frames and the welding of the side frames to the center frame can be carried out by the same welding robot in the same process, thereby solving the above-described problems.

To this end, according to the present invention, there is provided means of assembling a vehicle body of a two-wheeled vehicle in which, by using a center jig for holding a plurality of center members such as a head pipe and cross members and a pair of side jigs arranged on the left and right-hand sides for holding side frames on the respective left and right-hand sides of the vehicle body, the center members and the side frames are welded together in a state in which the side jigs are erected on both sides of the center jig, the means characterized in that respective side jigs are so arranged as to comprise a jig frame formed of frame materials and holding members provided to position and hold a plurality of side frame members constituting the side frames and attached to the jig frame; the side frame members are, after being set on the respective side jigs which are placed in a prostrated state, welded by a welding robot to assemble the side frames; and the side jigs are erected so that the center members and the side frames may be welded by the welding robot applied through spaces available in the frames of the side jigs.

Since the side frame members are welded to one another to assemble them into the side frames while being positioned and held by the respective holders of the side jigs and the side frames so assembled are welded together with the center members while still held in position in the side jigs, the center members are able to be welded to the side frames held in a state free of possible distortion caused by the welding strains of the side frames themselves, thereby improving assembling precision of the vehicle body.

In addition, for welding together the side frames and the center members with the side jigs set in their upright positions, the welding torches to be attached to the welding robot can be inserted from the outside into spaces in the frames of the side jigs and moved along the welding portions between the side frames and the center members. This allows a longer weld to be made for greater welding strength even at a tack welding, so that the correction of the warp or deformation that may otherwise be required in the final welding process is unnecessary.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 18 is a perspective view of a vehicle body of a two-wheeled vehicle.

DETAILED DESCRIPTION OF PREFERRED EMBODIMENTS

Figure 1:
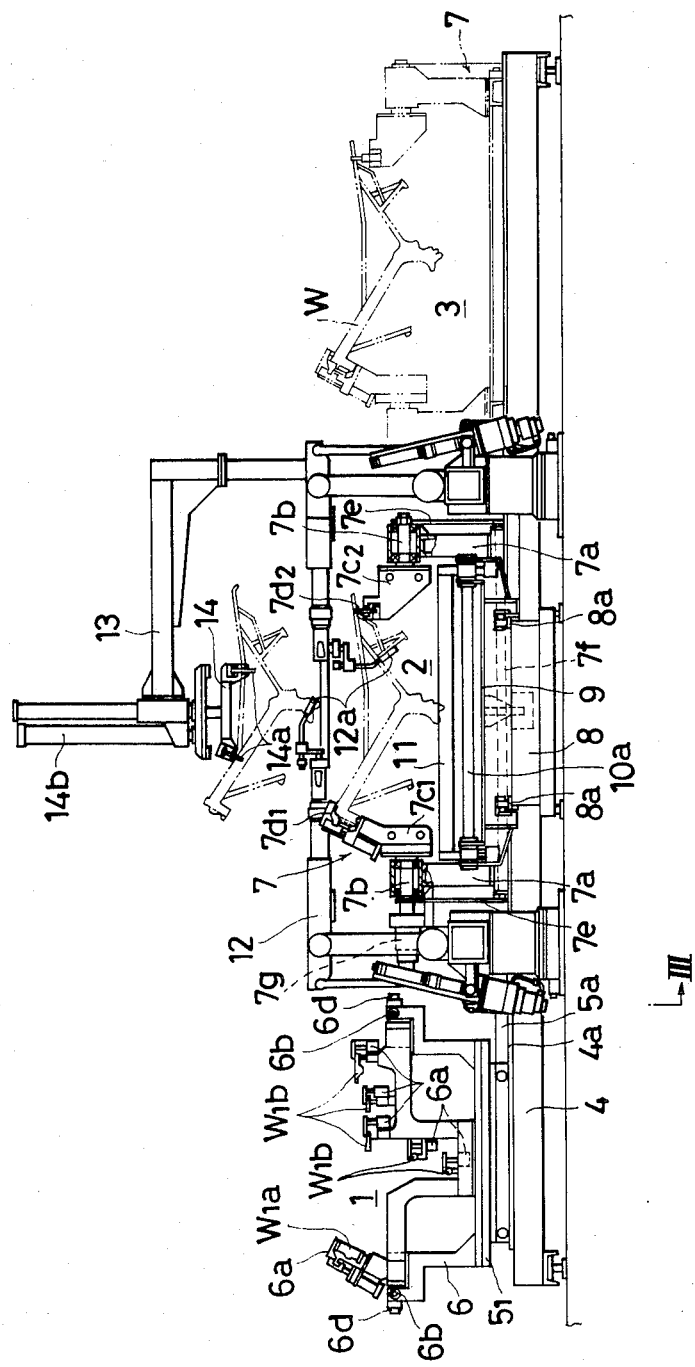
FIG. 1 is a side elevational view of a vehicle body assembly line which is used in implementing the present invention.
Figure 2:
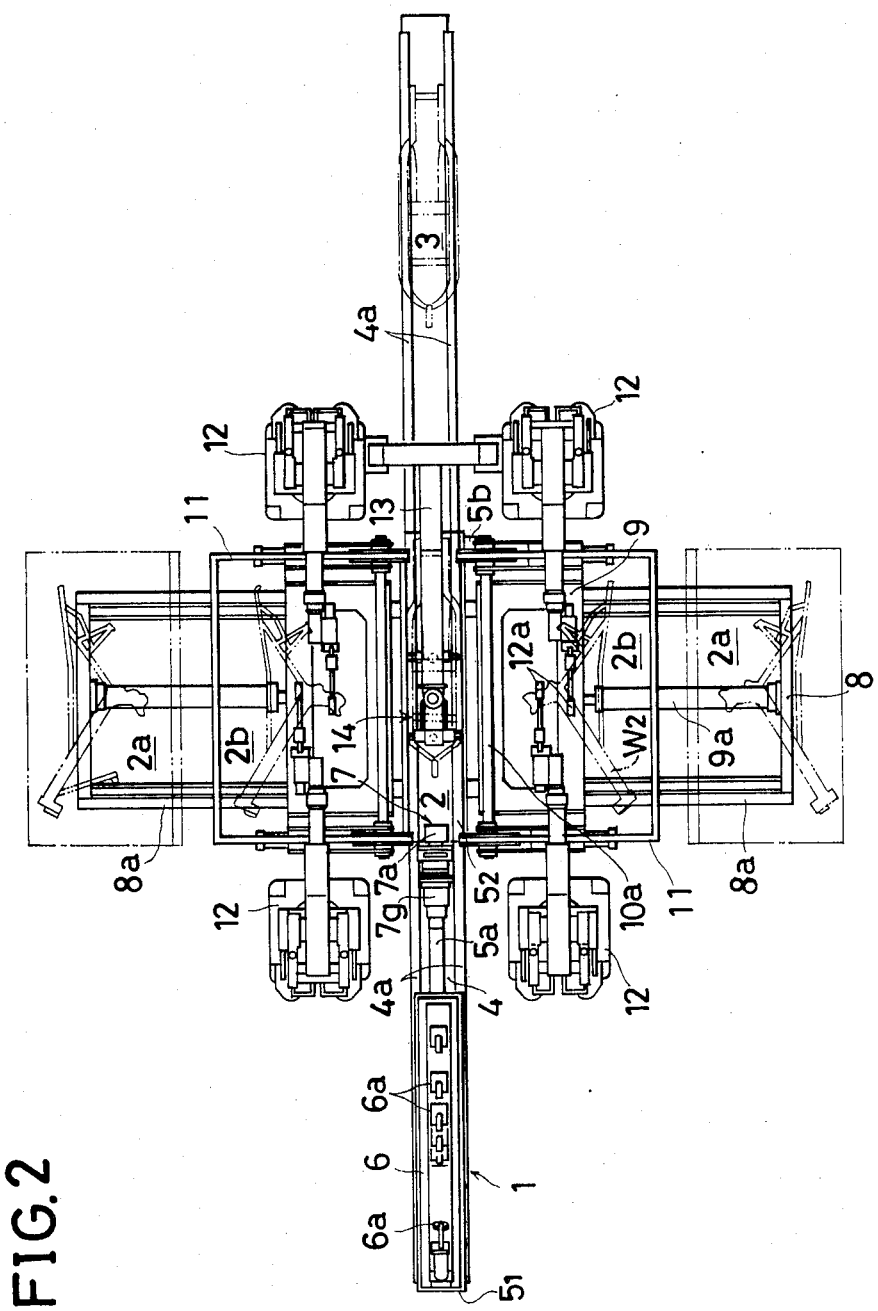
FIG. 2 is a top plan view thereof.
Figure 3:
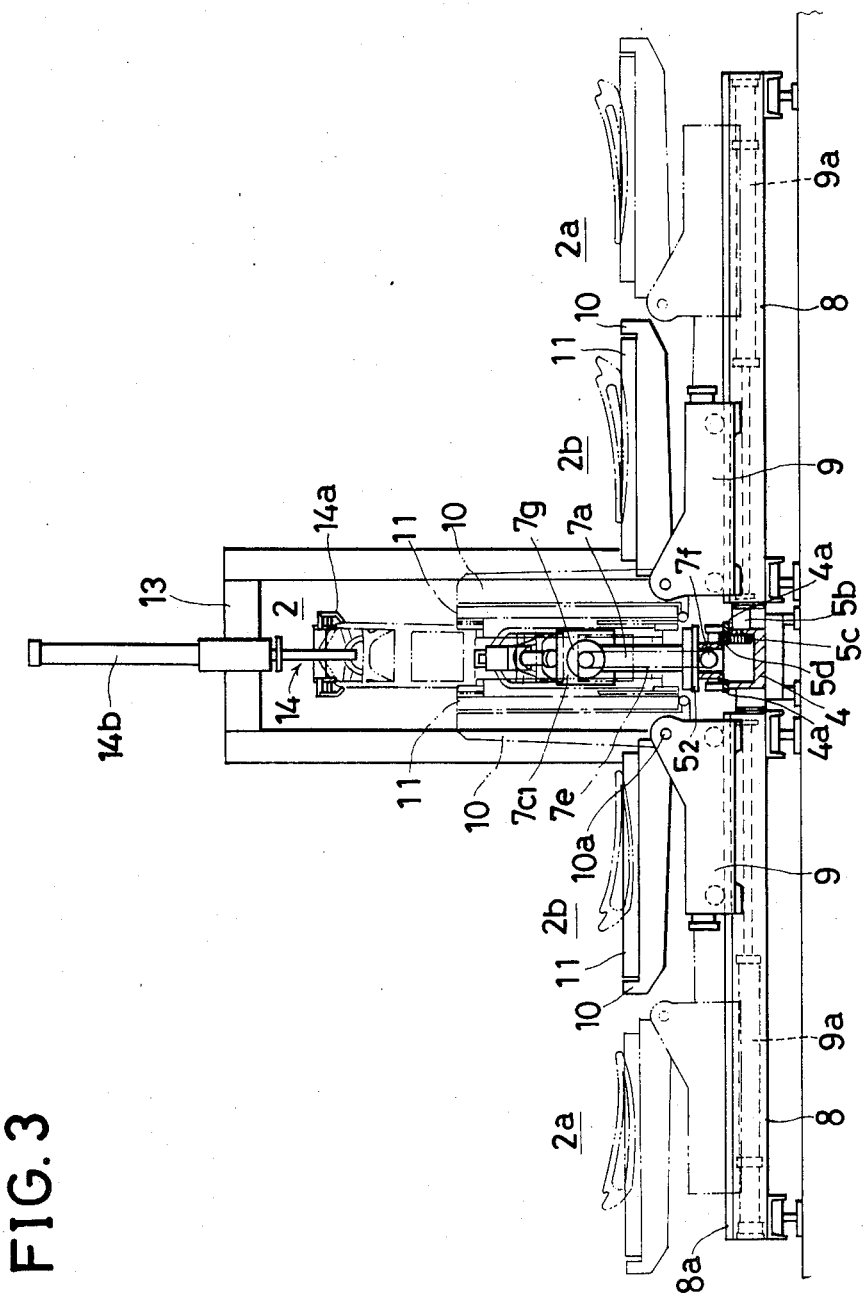
FIG. 3 is a front elevational view of a coupling station during tack welding, taken along the line III—III of FIG. 1, with welding robots omitted.

The drawings illustrate an embodiment in which, as shown in FIG. 18, a vehicle body W of a two-wheeled vehicle is assembled by welding together a center member $W_1$ comprising a head pipe W1a and various cross members W1b and left and right side frames $W_2$, each comprising a main upper frame W2a, a rear upper frame W2b, a down tube W2c, a rear stay W2d, and a bracket W2e. As illustrated in FIGS. 1 and 2, an assembly line for the vehicle body includes a set station 1, a coupling station 2, and a discharge station 3 arranged in that order from front to rear. Two carriages $5_1$, $5_2$ including a front carriage and a rear carriage are coupled with each other via a coupling rod 5a and are mounted on a pair of rails 4a attached to a track 4 laid to extend from the set station 1 to the discharge station 3. As shown in FIG. 3, a rack 5d engaging with a pinion 5c on an output shaft of a conveyor motor 5b is installed on the underside of the second carriage $5_2$ in the front so that, by forward and reverse revolutions of the motor 5b, the first carriage $5_1$ in the rear may be moved to reciprocate between the set station 1 and the coupling station 2, and the second carriages $5_2$ moved to reciprocate between the coupling station 2 and the discharge station 3, through a mutually interlinked operation. A center jig 6 to which a plurality of holding members 6a for holding various center members $W_1$ are attached is mounted on the first carriage $5_1$. A rotational jig 7 rotatably supporting the vehicle body W is mounted on the second carriage $5_2$. A slide table 9 is provided on each of both the left and right sides of the welding station 1. The slide table 9 on each side is moved by a shift cylinder 9a to advance or retreat transversely with respect to the assembly line along a pair of rails 8a on a slide base 8. A jig holder 10 is provided on each slide table 9 and is capable of rising or prostrating by pivoting about a lower end shaft 10a extending in the longitudinal direction. A side jig 11 for holding the side frame $W_2$ is provided on each of the jig holders 10. In addition, through movement of each slide table 9, each of the side jigs 11 is made capable of moving freely, in its prostrate posture, between a setting location 2a located transversely outwardly and a welding location 2b located inwardly. After each of the side members is set on each of the side jigs 11 at the setting location 2a, each side jig 11 is moved to its welding location 2b, and the side members are welded together by a pair of front and rear welding robots 12 disposed on both the left and right sides of the coupling station 2. Each robot is equipped with a welding torch 12a, so as to assemble the side frames $W_2$. Next, the side jigs 11 are turned upright and coupled with the center jig 6 from both sides as the center jig 6 is thrown into the coupling station 2, so that the side frames $W_2$ can be welded onto the center member $W_1$ held in the center jig 6.

Figure 4:
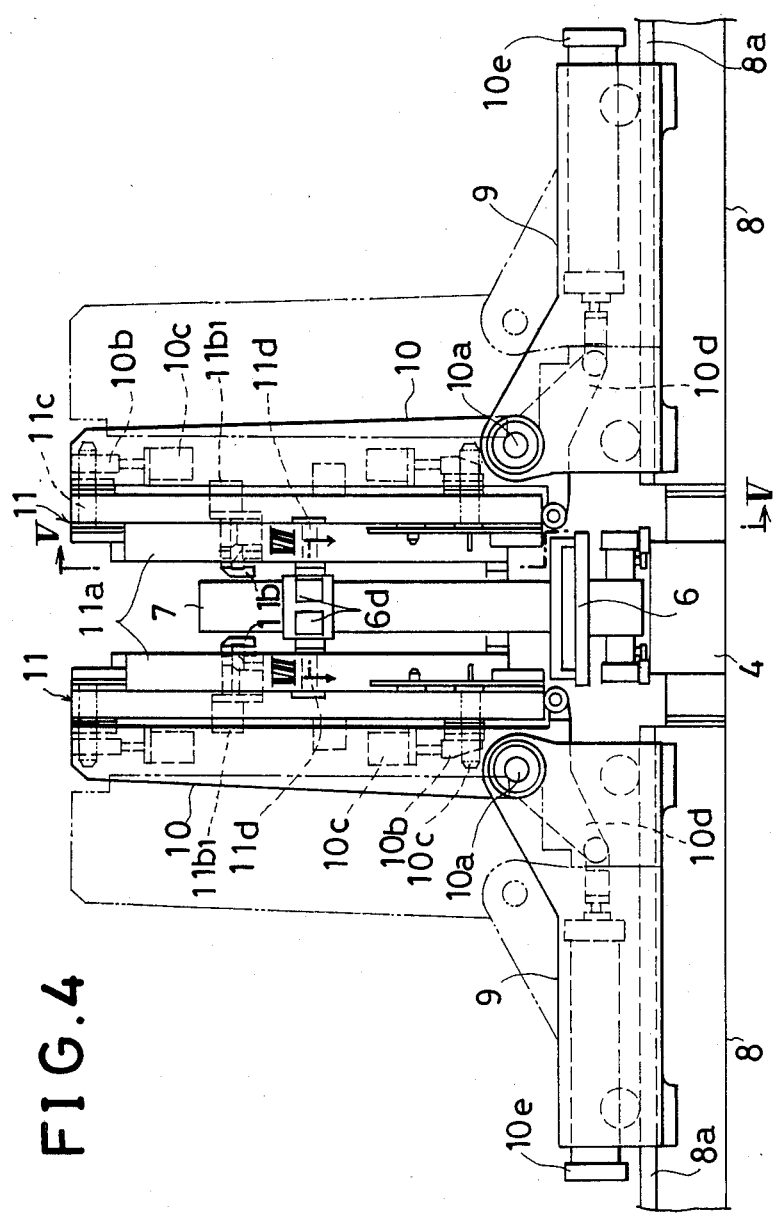
FIG. 4 is an expanded front elevational view of a center jig and a side jig.
Figure 5:
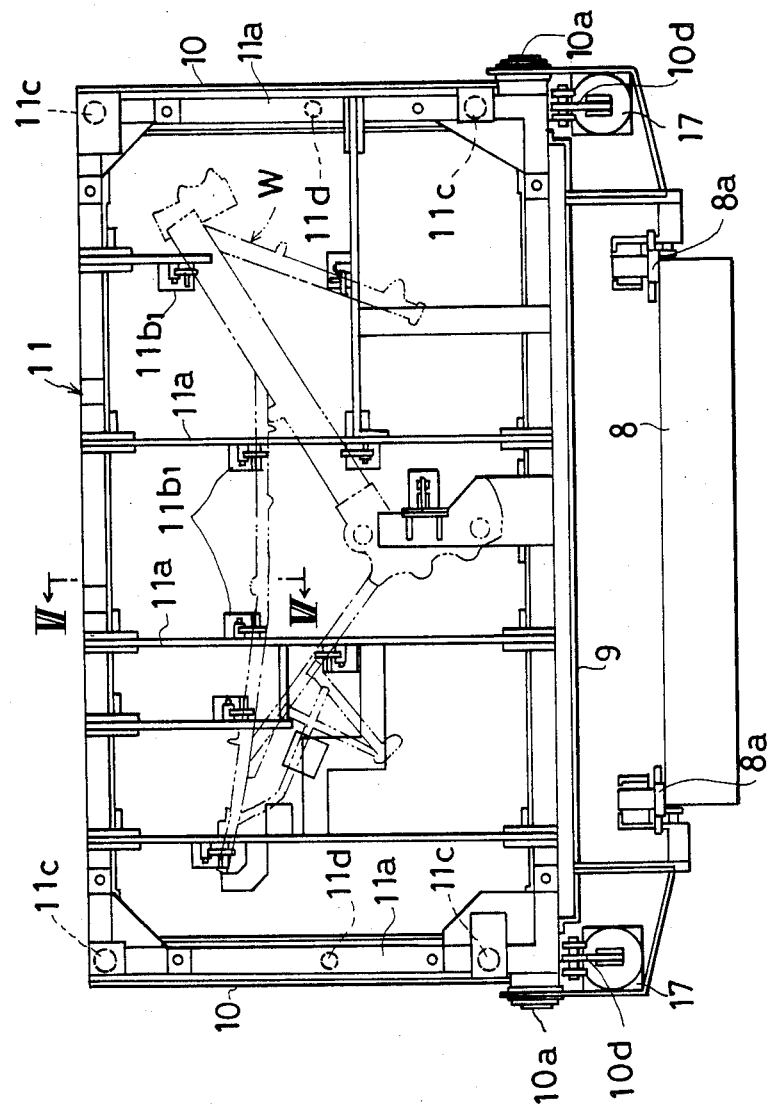
FIG. 5 is a side elevational view of the side jig taken along the line V—V of FIG. 4.
Figure 6:
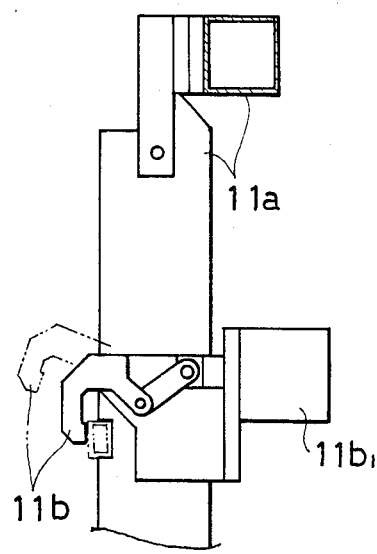
FIG. 6 is an enlarged cross-sectional view taken along the line VI—VI of FIG. 5.
Figure 7:
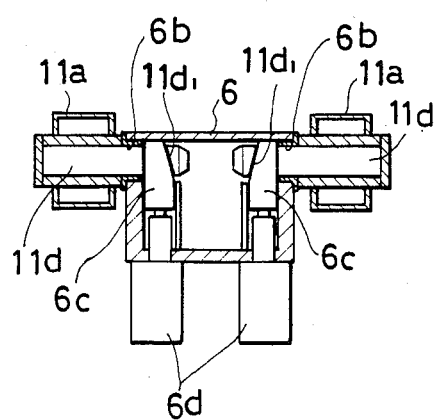
FIG. 7 is an enlarged cross-sectional view taken along the line VII—VII of FIG. 4.

As shown in FIGS. 4 and 5, each of the side jigs 11 is arranged to comprise a jig frame 11a formed of frame materials and a plurality of holding members 11b which are opened and closed by a cylinder $11b_1$ such as the one shown in FIG. 6 for positioning and holding the respective side frame members and which are attached to the jig frame 11a. The jig holder 10 is provided with lock cylinders 10c for actuating engaging pieces 10b which respectively engage with lock pins 11c projecting at the four corners on the rear surface of the jig frame 11a, so that the side jig 11 is made attachable to and detachable from the jig holder 10 by the engaging or disengaging action of the engaging pieces 10b by means of the cylinders 10c. Further, as a docking means for coupling the center jig 6 with the side jigs 11, as shown in FIG. 7, each side jig 11 is provided at its front and rear ends with docking pins 11d while the center jig 6 is provided at its front and rear ends with docking holes 6b for having the pins 11d inserted therethrough and with docking cylinders 6d for actuating the engaging pieces 6c for engagement with the pins 11d. As the side jigs 11 advance transversely inwardly in their upright postures, the docking pins 11d are inserted into the docking holes 6b from sides respectively. The engaging pieces 6c engage with engaging grooves $11d_1$ provided at the tip portions of the pins 11d, in the longitudinal direction, by operation of the docking cylinders 6d, thereby coupling the side jigs 11 with the center jig 6 for positioning them for subsequent welding at the coupling station 2.

The jig holders 10 have lever portions 10d extending from the front and rear ends thereof which are coupled with a pair of cylinders 10e, arranged one in front of the other. The rising and prostrating of the jig holders 10 is effected by the operation of the cylinders 10e, as described above to rotate the jig holders 10 about the axis of the shafts 10a.

As shown in FIGS. 1 and 3, the rotational jig 7 has a pair of rotational frames $7c_1$, $7c_2$ pivotally supported by a pair of shafts 7b (which are located on th same longitudinal axis) on a pair of columns 7a mounted on the second carriage $5_2$ with one in front of the other. A clamp member $7d_1$ for holding a head pipe W1a is installed on the first rotational frame $7c_1$ located in the rear. A clamp member $7d_2$ for holding the rear upper frame W2b is installed on the second rotational frame $7c_2$ located in the front. A longitudinally extending long synchronizing shaft 7f is coupled with the pair of shafts 7b of the rotational frames $7c_1$, $7c_2$ via a pair of chains 7e and is pivotally supported by the second carriage $5_2$. The two rotational frames $7c_1$, $7c_2$ are thus adapted to be rotated in synchronism with each other by a motor 7g mounted on the rear column 7a.

In addition, a transfer jig 14 provided with a holding member 14a for the vehicle body W is provided on a machine frame 13 above the coupling station 2 and is liftable and lowerable by a cylinder 14b.

Description will now be given of an operating process in the above-described assembly line.

First, the center jig 6 is returned to the set station 1, and the center member $W_1$, including the head pipe W1a, is set on the jig 6. A the same time, the side jigs 11 are retreated to the transversely outward setting locations 2a by the operation of the slide tables 9 while the side jigs 11 are kept prostrate. The side frame members, including the main upper frame W2a, are set on the side jigs 11. The side jigs 11 with these side frame members held thereon by the respective holding members 11b are then advanced to the transversely inward welding locations 2b. The welding portions of the side frame members on the side jigs 11 are welded to one another by the pair of welding robots 12. In the meantime, the center jig 6 is fed into the coupling station 2.

After the assembly of the side frames $W_2$ by the welding of the side frame members is completed, the side jigs 11 are erected, and are coupled with the center jig 6 on both sides by the docking means.

According to the foregoing, the side frames $W_2$ located on the left and right-hand sides stand opposed to each other to have therebetween the center member $W_1$ held by the center jig 6. In this state, the welding torches 12a of the welding robots 12 are inserted through spaces in the frames of the respective side jigs 11 and placed close to those portions of the center member $W_1$ at which the side frames $W_2$ are to be welded. The placement of the welding torch is changed from one location to another with progress of the welding. Welding at the welding portions is performed so as to provide the longest possible welds obtainable for tack welding of the vehicle body W in this arrangement.

Next, the holding members 11b of the side jigs 11 are opened, and the side jigs 11 are retreated to the setting locations 2a through the operation reverse to that described above. The transfer jig 14 is then lowered to have the vehicle body W on the center jig 6 held by the transfer jig 14. The transfer jig 14 is thereafter lifted to lift the vehicle body W from the set jig 6. In this state, the first and second carriages $5_1$, $5_2$ are returned, and the center jig 6 is moved to the set station 1 while the rotational jig 7 is moved to the coupling station 2. Thereafter, the transfer jig 14 is lowered, and the head pipe W1a and the rear upper frame W2b of the vehicle body W are held by the clamp members $7d_1$, $7d_2$ attached to the rotational frames $7c_1$, $7c_2$ of the rotational jig 7. The transfer jig 14 is then lifted, the two rotational frames $7c_1$, $7c_2$, are rotated as described above, and the final welding is performed by the welding robots 12 while varying the posture of the vehicle body w.

In addition, while the final welding is going on, operations to set the next center member $W_1$ on the center jig 6 at the set station 1 and to set the next side frame members on the respective side jigs 11 at the setting location 2a are carried out simultaneously. After completion of the final welding, the first and second carriage $5_1$, $5_2$ are advanced forward, and the center jig 6 is moved to the coupling station 2 while the rotational jig 7 is moved to the discharge station 3, after which the welding of the vehicle body at the coupling station 2 according to the same procedures as described above and the discharge of the vehicle body W from the discharge station 3 are carried out.

According to the above-described arrangement, it is possible to carry out both the tack welding and the final welding of the vehicle body W by means of the common robot 12 at the single coupling station 2, this bringing about the advantage that the assembly line is shortened and reduction in equipment cost is materialized due to fewer welding robots required.

However, in order to increase production in terms of number of assembled vehicle bodies by reducing the time to complete one cycle of assembly work, it is preferable to perform the final welding at a station different from the coupling station 2.

Figure 8:
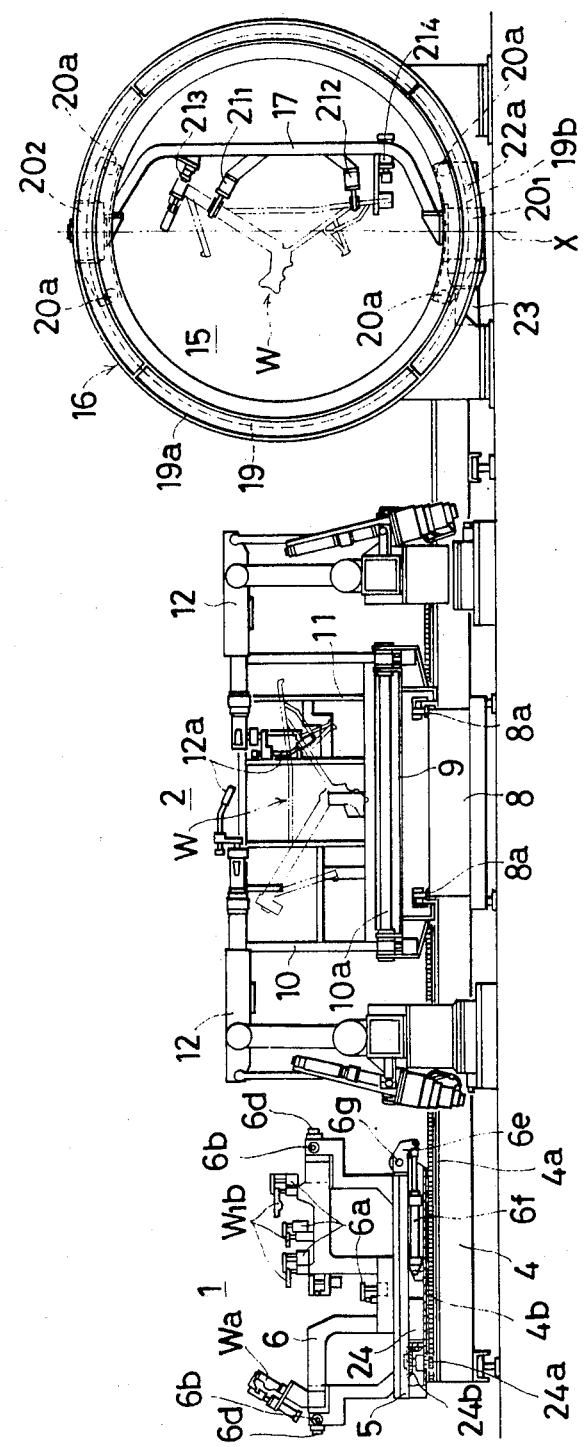
FIG. 8 is a side elevational view of a modification of the vehicle body assembly line.
Figure 9:
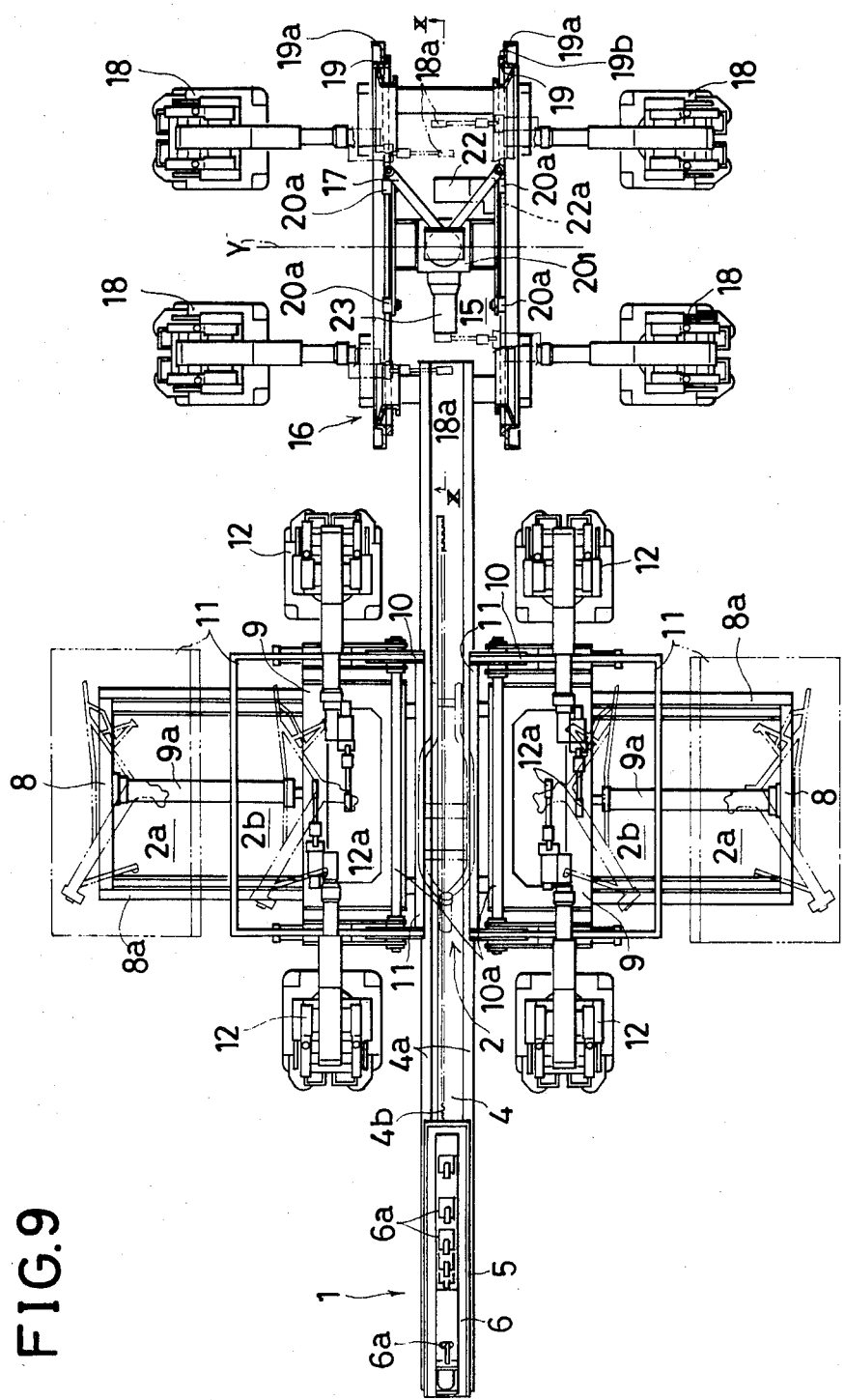
FIG. 9 is a top plan view thereof.

Accordingly, in an embodiment shown in FIGS. 8 and 9, a final welding station 15 is provided in front of the coupling station 2. In this arrangement, a vehicle body W tack-welded at the coupling station 2 is transferred onto a jig device 16 which has a welding jig 17 and will be described later, and the final welding of the vehicle body W is applied by a pair of welding robots 18 equipped with welding torches 18a and arranged transversely on the left and right-hand sides of the station 15.

Figure 10:
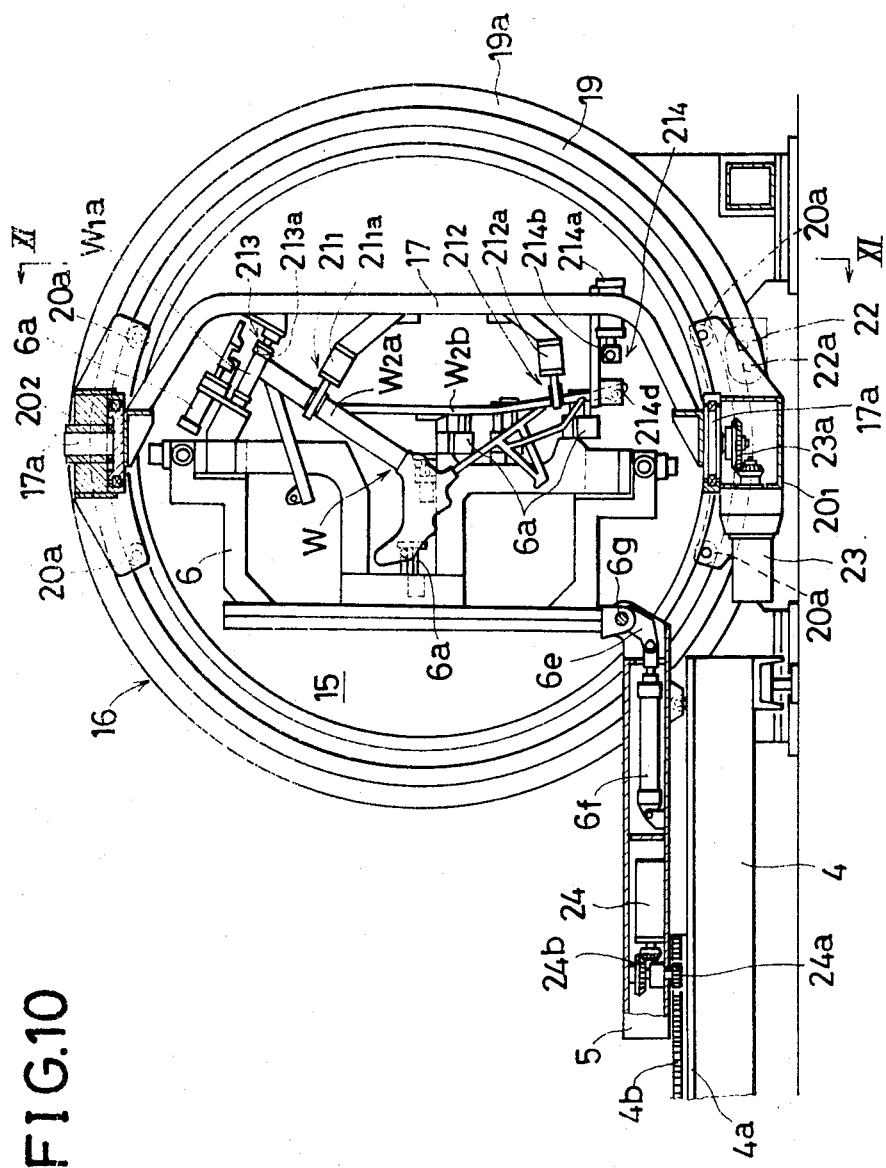
FIG. 10 is an enlarged cross-sectional view of a final welding station taken along the line X—X of FIG. 9, at the time of delivery of the vehicle body.
Figure 11:
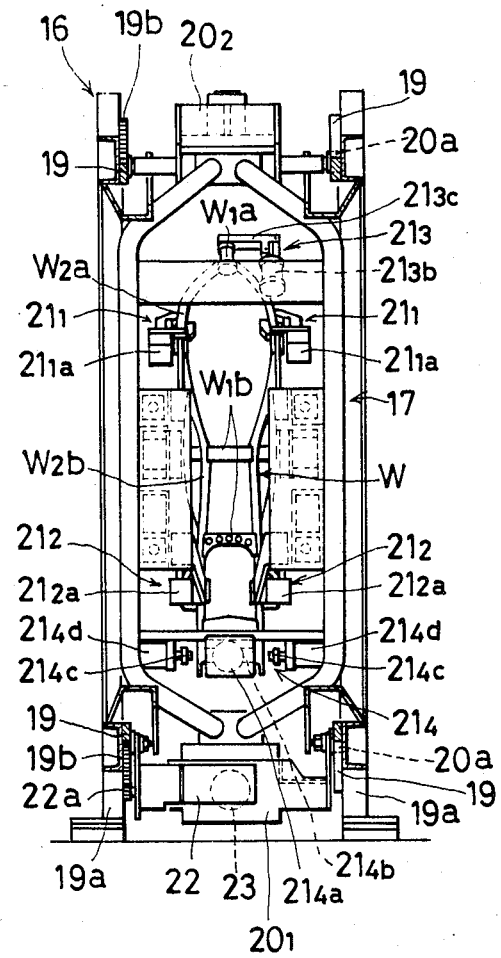
FIG. 11 is an enlarged cross-sectional view of a jig device taken along the line XI—XI of FIG. 10.

As clearly shown in FIGS. 10 and 11, the jig device 16 is arranged as follows: A pair of circular guide rails 19 are disposed to face each other such that the centers thereof are located on a common transversely horizontal axis (hereinafter referred to as Y-axis). The longitudinally extending welding jig 17 for holding the vehicle body W is interposed between the guide rails 19 such that the longitudinal direction thereof is aligned with the diametrical direction of the guide rails 19. The welding jig 17 is movably supported by the guide rails 19 via holders $20_1$, $20_2$ provided at longitudinal ends thereof, while the jig 17 is set to be capable of revolving around the Y-axis. At the same time, the jig 17 is rotatably supported between the holders $20_1$, $20_2$ around a diametrical axis of the guide rails 19 (hereinafter referred to as the X-axis). To give a more detailed explanation of this arrangement, the guide rails 19 are fixed on the inner side surfaces of a pair of annular fixed frames 19a arranged on the left and right-hand sides and provided uprightly on the final welding station 15. Two pairs of guide rollers 20a, arranged on the left and right-hand sides, are provided to the respective holders $20_1$, $20_2$. The guide rollers 20a, arranged on the left and right-hand sides, are disposed to rotatably abut against the inner peripheral surfaces of the guide rails 19. Thus, the holders $20_1$, $20_2$ are movably supported by the guide rails 19. Furthermore, a pinion 22a meshing with a rack 19b formed on the outer peripheral surface of one of the guide rails 19, and a revolution motor 22 for driving the pinion 22a are mounted on a first holder $20_1$ disposed below the drawing, thereby making it possible to cause the welding jig 17 to undergo revolving motion around the Y-axis by operation of the motor 22. In addition, it is arranged such that the welding jig 17 is pivotally supported on the holders $20_1$, $20_2$ at a pair of shaft portions 17a along the X-axis on both ends thereof. A rotation motor 23 coupled with the shaft portion 17a via a bevel gear 23a is mounted on the first holder $20_1$, thereby making it possible to allow the jig 17 to undergo rotational motion around the X-axis by operation of the motor 23.

The jig 17 is provided with the following: a pair of first grip members $21_1$ arranged on the left and right-hand sides and adapted to grip the main upper frame W2a; a pair of second grip members $21_2$ arranged on the left and right-hand sides and adapted to grip the rear upper frame W2b; a third grip member $21_3$ for gripping the head pipe W1a; and a fourth grip member $21_4$ for gripping a tail gate at the rear end. The first and second grip members $21_1$, $21_2$ are adapted to be opened and closed by cylinders $21_1a$, $21_2a$. The third grip member $21_3$ comprises a positioning pin $21_3a$ designed to fit in with an apex of the head pipe W1a and a clamp piece $21_3c$ designed to permit abutting against a bottom of the head pipe W1a which is opened and closed by the cylinder $21_3b$. The fourth grip member $21_4$ comprises a spacer $21_4b$ which is advanced and retreated by a cylinder $21_4a$ and inserted into the tail gate and a pair of pressing cylinders $21_4d$ provided with an engaging pin $21_4c$ for engagement with the tail gate.

In this embodiment a single carriage 5 is mounted on the pair of rails 4a on the track 4. The carriage 5 is provided with a pinion 24a meshing with rack 4b fixed to the track 4 and a conveyor motor 24 for driving the pinion 24a via a bevel gear 24b so as to make the carriage 5 movable from the set station 1 to the final welding station 15 via the coupling station 2 by the operation of the motor 24. The center jig 6 is mounted on the carriage 5 in such a manner that it may be turned upright and prostrated with a transversely horizontal shaft 6g as a swing axis by the operation of a cylinder 6f of which is disposed on the carriage 5 and is coupled with a lever 6e projecting at a lower front end of the center jig 6.

After tack welding of the vehicle body W is performed in the coupling station 2, the carriage 5 is moved to the side of the final welding station 15, and the center jig 6 is erected. At the same time, the welding jig 17 is erected in advance by its revolving operation around the Y-axis so as to face the center jig 6 which is in the upright position. In this state the vehicle body W is delivered from the center jig 6 to the welding jig 17.

In this case, the center jig 6 should be erected in a state in which the holding member 6a for the head pipe W1a provided in the center jig 6 is opened. The welding jig 17 is arranged so that the positioning pin $21_{3a}$ of the third grip member $21_3$ may fit in with the apex of the head pipe W1a with erection of the center jig 6. Subsequently, after the main upper frame a W2a and the rear upper frame W2b of the vehicle body W are gripped by the first and second grip members $21_1$, $21_2$, the center jig 6 is brought down to its prostrated posture in a state in which all the holding members 6a are opened. Thereafter, the clamp piece $21_{3c}$ of the third grip member $21_3$ is closed to grip the head pipe W1a and at the same time, the spacer $21_{4b}$ of the fourth grip member $21_4$ is inserted into the tail gate for gripping of the tail gate by the operation of the pair of pressing cylinders $21_{4d}$. Using the head pipe W1a and the tail gate as references, the vehicle body W is accurately positioned and held with respect to the welding jig 17. In this state, the welding jig 17 is caused to undergo revolution around the Y-axis and rotation around the X-axis so as to enable and carry out the final welding by the welding robots 18 while controlling the vehicle body W to vary its posture two-dimensionally.

As described above, when it is so arranged that the vehicle body W is delivered directly from the center jig 6 to the welding jig 17, a conveying apparatus for transfer and mounting becomes unnecessary. This results in a lower equipment cost which is an advantage.

Figure 12:
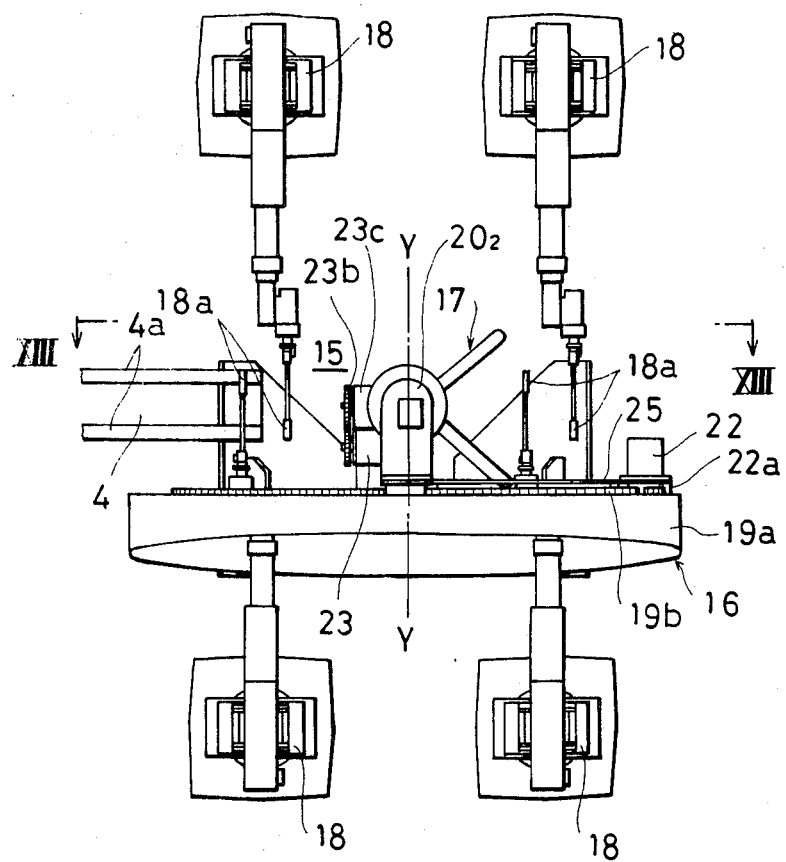
FIG. 12 is a top plan view of the final welding station in which a different jig device is arranged.

However, in the above-described embodiment, the moment working toward inclining the second holder $20_2$ acts on the second holder $20_2$ via the welding jig 17, said moment resulting from the thrust of the first holder $20_1$ generated by the revolution motor 22. Hence, there are cases where the welding jig 17 fails to revolve smoothly, and a jig device 16 which overcomes such a fault is shown in FIGS. 12 to 14.

The jig device 16 is arranged such that a single annular guide rail 19 with the Y-axis serving as its center is fitted on an inner periphery of a tubular fixed frame 19a via a plurality of supporting pieces 19c. A circular arc-shaped movable frame 25 is supported by the guide rail 19 and is capable of revolving freely in the circumferential direction. A pair of holders $20_1$, $20_2$ supporting the welding jig 17 such as to be rotatable around the X-axis are attached to both ends of the movable frame 25.

Figure 15:
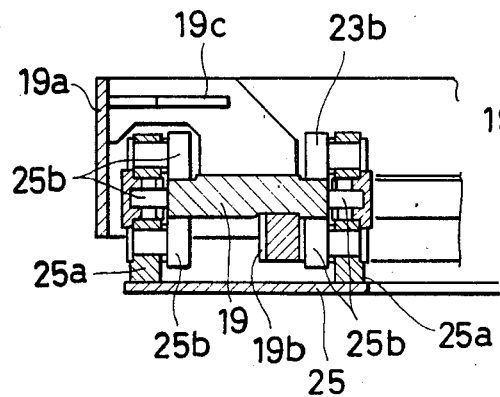
FIGS. 15 to 17 are enlarged cross-sectional views taken along the lines XV—XV to XVII—XVII if FIG. 13
Figure 16:
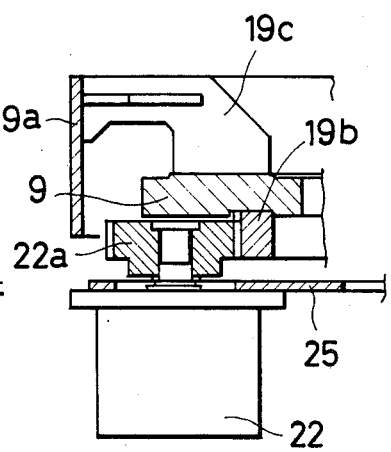

To give a more detailed explanation of this arrangement, as shown in FIG. 15, each pair of brackets 25a located on the inner and outer peripheral side of the guide rail 19 are provided on the inner surface of each of the three spots of the movable frame 25 including both ends and the mid-portion thereof such as to be projecting therefrom. A plurality of rollers 25b for abutting against the both sides of the guide rail 19 are pivotally supported by each of the brackets 25a. In addition, a revolution motor 22 having a pinion 22a disposed on an output shaft and meshing with a rack 19b fixed to the guide rail 19 is mounted on the outer surface of the mid-portion of the movable frame 25 as shown in FIG. 16 so that a thrust in the revolving direction may act on the mid-portion of the movable frame 25 with a good balance by the operation of the motor 22 via the pinion 22a. Thus, smooth revolution around the Y-axis is imparted to the jig 17 via the movable frame 25.

Figure 13:
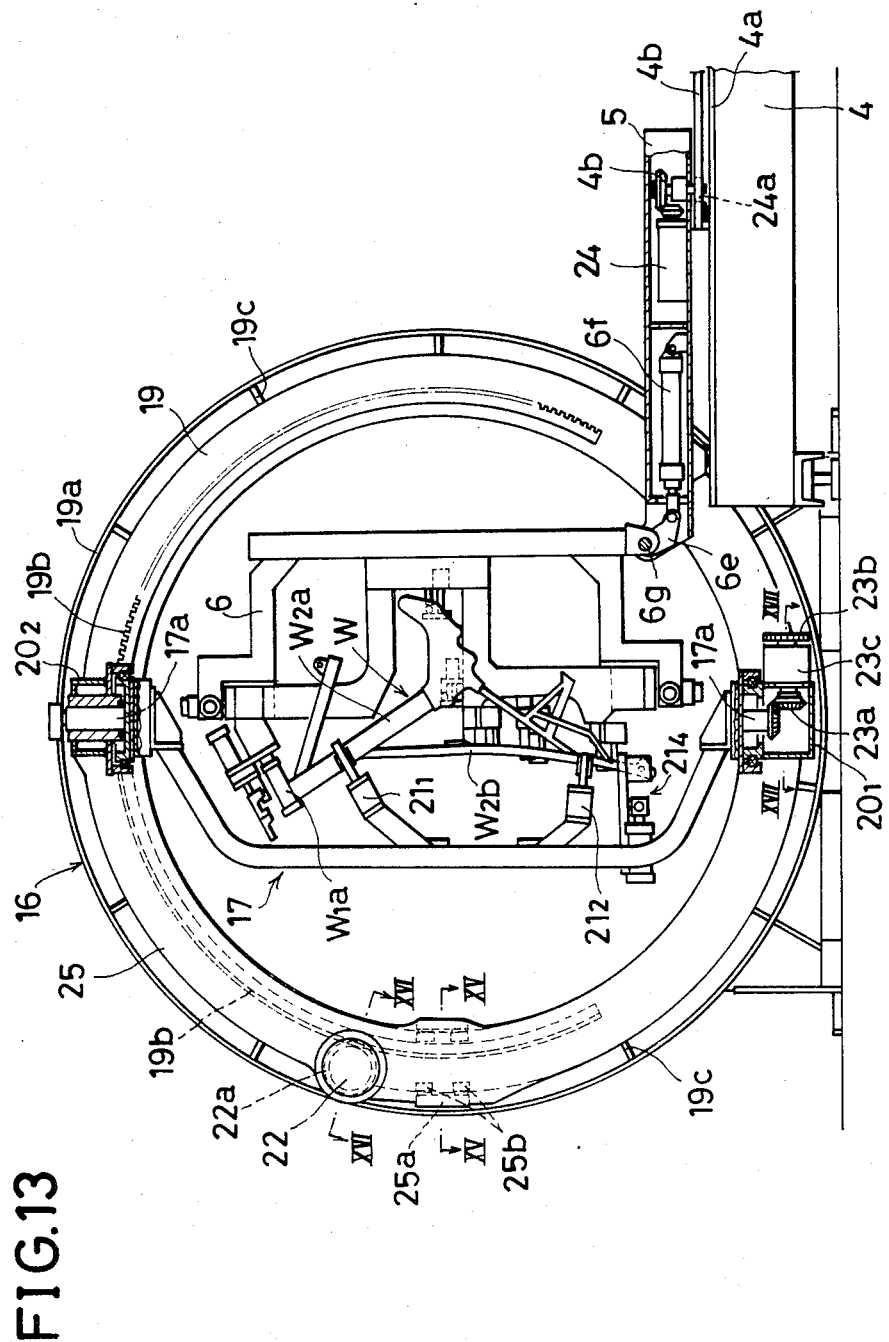
FIG. 13 is a side elevational view of the final welding station taken along the line XIII—XIII of FIG. 12, during the delivery of the vehicle body.
Figure 14:
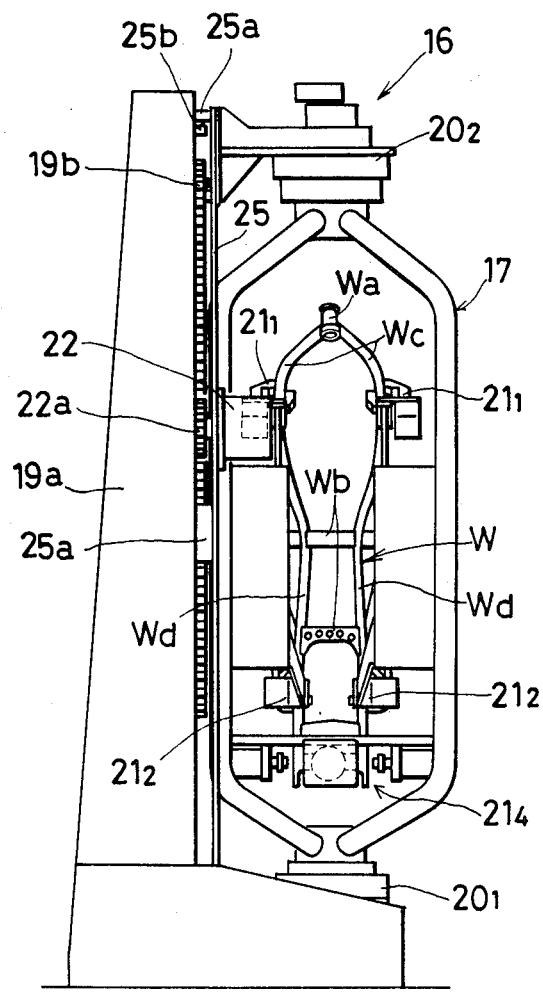
FIG. 14 is a front elevational view of the jig device as viewed from the left in FIG. 13.
Figure 17:
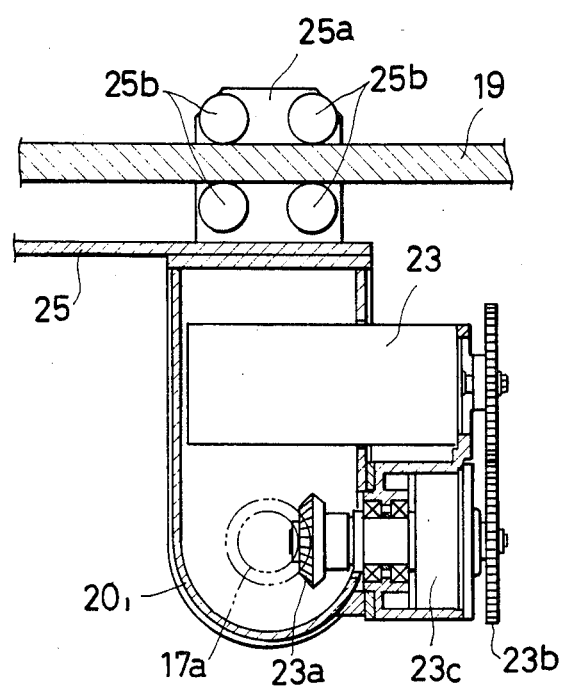

In addition, a shown in FIGS. 13 and 17, a rotation motor 23 and a harmonic drive-type reducing gear 23c coupled with the motor 23 via a gear train 23b are mounted on the first holder $20_1$ located at one end. The reducing gear 23c and the shaft portion 17a at one end of the welding jig 17 are coupled with each other via the bevel gear 23a. Thus, the jig 17 is caused to rotate around the X-axis by the operation of the motor 23 as in the earlier embodiment.

Incidentally, in this welding jig 17, the third grip member $21_3$ used in the earlier embodiment is omitted.

Furthermore, although the guide rail 19 of the jig device 16 is formed into an annular shape in the respective embodiments, this guide rail !9 may be formed into the shape of a circular arc with a peripheral portion cut away.

As has been described in the foregoing, according to the present invention, a separate assembly device for the side frames becomes unnecessary, and the side jig can be made simplestructured and inexpensive one having no welding torches. Thus, it is possible to bring about a substantial reduction in the equipment cost. Moreover, since the side frame members are kept positioned in place on the side jigs not only when welded together to assemble the side frames but also when further welding the side frames with the center member, it is possible to prevent otherwise possible deformation of the side frames upon assembling the vehicle body. At the same time, since the welding between the side frames and the center member is performed by the welding robots applied through the spaces in the frames of the side jigs, it is possible to increase the weld length at the tack welding stage, thereby strengthening the welding strength and further eliminating the possible need for correcting such deformation during the final welding.

This results in reduction of the welding time during the final welding process.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claimed in determining the full scope of the invention.

What is claimed is:

1. A method of assembling a vehicle body of a two-wheeled vehicle in which, by using a center jig for holding a plurality of center members including a head pipe and cross members and a pair of side jigs arranged on the left and right-hand sides for holding side frames on the respective left and right-hand sides of said vehicle body, said center members and said side frames are welded together in a state in which said side jigs are erected on both sides of said center jig, said method comprising the steps of:

arranging each said side jig to comprise a jig frame formed of frame materials and holding members attached to the jig frame, said holding members being adapted to position and hold a plurality of side frame members constituting said side frame;

setting said side frame members on respective said side jigs in a state in which said side jigs are prostrated;

welding said side frame members together by welding robots to assemble said side frames; and erecting said side jigs and welding said center members with said side frames by said welding robots applied through spaces in said frames of said side jigs.

2. An apparatus for assembling a vehicle body of a two-wheeled vehicle comprising:

a center jig mounted on a carriage which is reciprocatable between a set station and a coupling station disposed forwardly thereof, said center jig being adapted to hold a plurality of center members including a head pipe and cross members;

a pair of side jigs disposed on both sides of said coupling station in such a manner as to be freely erected and prostrated, each side jig having a jig frame formed of frame material and a plurality of holding members attached to said jig frame for positioning and holding a plurality of side frame members constituting side frames arranged to be on the left and right-hand sides of said vehicle body; and at least a pair of welding robots disposed on both sides of said coupling station such that they can not only weld said side frames members to assemble said side frames while said side jigs are in a prostrated posture but also weld said center members with said side frames held on said side jigs in an upright posture through spaces in the frames of said side jigs.

3. An apparatus for assembling the vehicle body according to claim 2, further comprising a pair of slide tables disposed on both sides of said coupling station in such a manner as to be capable of advancing and retreating freely in the transverse direction, said side jigs being supported by said slide tables to be capable of being erected and prostrated freely so as to allow said side jigs to be respectively movable between transversely outward setting locations and transversely inward welding locations.

4. An apparatus for assembling the vehicle body according to claim 2, further comprising:

a discharge station disposed forwardly of said coupling station;

a rotational jig disposed reciprocatably between said coupling station and said discharge station and adapted to rotatably hold said vehicle body;

an elevatable transfer jig disposed above the coupling station so as to lift from the center jig, transfer and mount the vehicle body obtained by tack-welding both side frames with the center members held on the center jig onto said rotational jig lowered into said coupling station, so that said vehicle body is transferred onto said rotational jig for final welding by said welding robots at the coupling station.

5. An apparatus for assembling the vehicle body according to claim 2, further comprising:

a final welding station disposed forwardly of said coupling station, said final welding station being provided with a jig device, a welding jig supported on said jig device for holding said vehicle body and rotatable around a transversely horizontal axis of said jig device, and welding robots adjacent said jig device for final welding of said vehicle body, and wherein said center jig is supported on said carriage such as to be capable of being erected and prostrated with a transversely horizontal shaft provided on a front end portion of the center jig as a swing axis, whereby it is possible to freely deliver said vehicle body from said center jig to said welding jig in a state in which said welding jig is so turned to its upright posture as to face said center jig in its upright posture.

6. An apparatus for assembling the vehicle body according to claim 5, wherein said jig device includes an annular or a circular-arc-shaped guide rail supporting said welding jig and having said horizontal axis as a center in such a manner that said welding jig postured to have its longitudinal direction extending along the diametrical direction of said guide rail may freely revolve around said horizontal axis and also rotate around the axis of said diametrical direction.

7. An apparatus for assembling the vehicle body according to claim 6, further comprising:

a circular arc-shaped movable frame disposed along said guide rail such as to be revolvable; a pair of holders provided at both ends of said movable frame to face each other in the diametrical direction of said guide rail, said welding jig being pivotally supported between said holders such as to be rotatable around the axis of said diametrical direction;

and a drive motor disposed in a substantially central portion of said movable frame and having a pinion on an output shaft thereof for meshing with a rack provided along said guide rail.

* * * * *